United States Patent [19]

Chino et al.

[11] Patent Number: 4,717,603
[45] Date of Patent: Jan. 5, 1988

[54] METHOD OF APPLYING A LIQUID TO A MOVING WEB

[75] Inventors: Naoyoshi Chino; Yasuhito Hiraki; Tsunehiko Sato; Hiroshi Chikamasa, all of Kanagawa; Norio Shibata, Tokyo, all of Japan

[73] Assignee: Fuji Photo Film Co., Ltd., Kanagawa, Japan

[21] Appl. No.: 930,475

[22] Filed: Nov. 14, 1986

[30] Foreign Application Priority Data

Nov. 15, 1985 [JP] Japan .................. 60-255011

[51] Int. Cl.$^4$ ............... H01F 10/02; B05D 1/18
[52] U.S. Cl. ................. 427/434.3; 427/128; 427/434.5
[58] Field of Search ............ 427/128, 434.3, 434.5

[56] References Cited

U.S. PATENT DOCUMENTS 3,679,476  7/1972  Van Oosterhout et al. ........ 427/128
4,424,762  1/1984  Tanaka et al.
4,480,583  11/1984  Tanaka et al.

Primary Examiner—Bernard D. Pianalto
Attorney, Agent, or Firm—Sughrue, Mion, Zinn, Macpeak & Seas

[57] ABSTRACT

A method of applying a liquid to a moving web while pushing an extrusion application head to the moving web without supporting the moving web on the reverse side thereof. The application is performed while the accumulation of the liquid to be applied to the moving web is maintained by (a) the moving web and (b) an edge of the back blade of the extrusion application head, the edge being defined by the intersection of (1) a first surface of the back blade which faces the front blade and which is nearest the web, and (2) a second surface of the back blade which is more remote from the front blade than the first surface and, wherein the pressure of the liquid of the accumulation located between the web and the outlet portion of the slit of the extrusion application head is set within a range from 0.2 kg/cm$^2$ gauge to 0.8 kg/cm$^2$ gauge per 50 cm of width of applied liquid.

2 Claims, 11 Drawing Figures

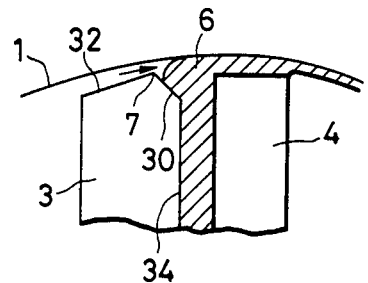
FIG. 6
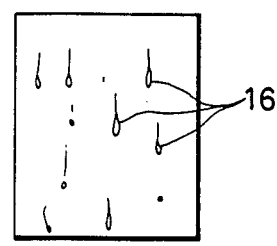
FIG. 7
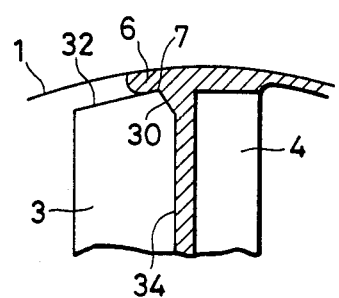
FIG. 8
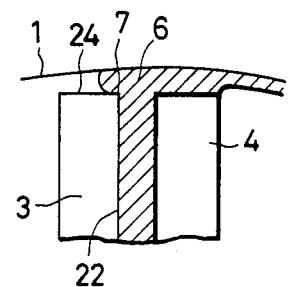
FIG. 9
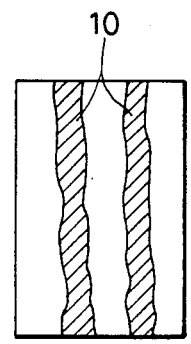
FIG. 10
FIG. 11
(a)
(b)
(c)

4,717,603

METHOD OF APPLYING A LIQUID TO A MOVING WEB

FIELD OF THE INVENTION

The present invention relates to a method of applying a liquid to a moving web, and more particularly relates to a method of applying a magnetic recording substance to a moving web.

BACKGROUND OF THE INVENTION

In the past, various methods of applying a magnetic recording substance to a moving web (hereinafter often referred to simply as a "web") have been employed including roller application, gravure application, extrusion application and slide bead application, combinations of these with doctor systems, and so forth.

Recently, a method of extrusion application and a method of applying a magnetic recording substance to a web while pushing an extrusion application head to the web without supporting the web on the reverse side thereof have been used in order to increase the speed of the application of the substance in the form of a film of small thickness and prevent defects such as the formation of a coagulated projection. In the latter method, the web and the extruder application head are in contact with each other when a liquid containing the magnetic recording substance is not being poured out. However, in that method, when the application of liquid to the web is started, a pool of liquid or liquid accumulation forms in the narrow gap between the web and the extrusion application head, so that the application of liquid to the web is performed without bringing the web into contact with the extrusion application head.

The above-mentioned methods are well-known because they are those disclosed in Japanese Patent Laid-Open Gazettes Nos. 57-84771, (U.S. Pat. No. 4,480,583) 58-104666, 59-94657, 58-189070 and 58-202075, and so forth.

In the above-mentioned well-known art, it was not clear what state or condition of the liquid accumulation between the application head and the web had which enabled the application of the liquid to the web, what conditions made the surface of the applied liquid good, and so forth. However, it has been very important to find out what conditions enable the proper application of the liquid in various quanities such as 5 cc./m² to 100 cc./m² at different application speeds to webs of various thicknesses.

SUMMARY OF THE INVENTION

The present inventors have made numerous studies in order to solve the above-mentioned problems.

Thus, it is an object of the present invention to provide a method of applying a liquid to a moving web while pushing an extrusion application head to the web without supporting the moving web on the reverse side thereof while overcoming the above problems.

To achieve the foregoing objects and in accordance with its purpose, the present invention provides a method of applying a liquid to a moving web while pushing an extrusion application head to the moving web without supporting the moving web on the reverse side thereof, wherein a liquid accumulation forms in a narrow gap between the web and the extrusion application head, the extrusion head having a back blade and a front blade which define a slit through which the liquid leaves the head, comprising: applying the liquid to the web while the accumulation of the liquid to be applied to the moving web is maintained by (a) the moving web and (b) an edge of the back blade of the extrusion application head, the edge being defined by the intersection of (1) a first surface of the back blade which faces the front blade and which is nearest the web, and (2) a second surface of the back blade which is more remote from the front blade than the first surface and, wherein the pressure of the liquid of the accumulation located between the web and the outlet portion of the slit of the extrusion application head is set within a range from 0.2 kg/cm² guage to 0.8 kg/cm² guage per 50 cm of width of applied liquid.

Thus, in the present invention, the liquid accumulation is maintained, as shown in FIGS. 2, 3, 4 and 5, at a top edge of the back blade near the web and near the slit defined by the blades.

As used herein, the terms "maintained", "maintaining", "keeping" or "kept" mean that the liquid accumulation reaches the above defined top edge of the back blade but does not extend beyond the above defined top edge of the back blade.

It is to be understood that both the foregoing general description and the following detailed description are exemplary and explanatory, but are not restrictive of the invention.

BRIEF DESCRIPTION OF THE DRAWINGS

FIG. 6 shows a side view of a liquid accumulation which is not in accordance with the present invention in which air adversely affects the liquid accumulation.

FIG. 7 shows a plan view of application defects made on a web as a result of air.

FIGS. 8 and 9 show sectional views of liquid accumulations which result in thick streams.

FIG. 10 shows a plan view of application defects which are thick streams on a web.

FIG. 11 shows sectional views of different back blades for an extrusion application head in accordance with the present invention.

DETAILED DESCRIPTION OF THE INVENTION

Figure 1:
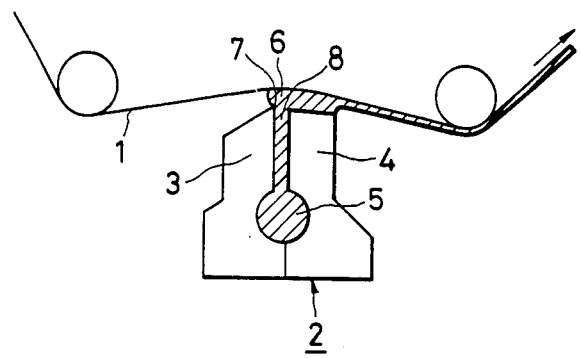
FIG. 1 shows a sectional view of one embodiment of the present invention.

The present invention is now described in detail. It is important that the accumulation of the liquid to be applied is maintained as described above, according to the present invention, in order to produce an excellent effect on the application of the liquid to web. Unless the liquid accumulation is maintained as described above, for instance, (a) if the liquid accumulation is not large enough as shown in FIGS. 6 and 7, air will cause the quality of the surface of the applied liquid film to become too low for practical use, or (b) if the liquid accumulation becomes too large and can not be maintained as described above, the liquid pours out over and beyond the edge of the back blade as shown in FIGS. 8 and 9, and as shown in FIG. 10, an irregularity, a streak or the like is formed which deteriorates the quality of the surface of the applied liquid film.

However, the conditions which enable maintaining the liquid accumulation at the edge of the back blade are not simple. For instance, the thickness of the web, the tension of the web portion to which the liquid is applied, the speed of the application, the applied quantity of the liquid, the kind of liquid, the viscosity (at the time of low shearing and at that of high shearing) of the liquid, the form of the top of the extrusion application head, and the angles of incoming and outgoing of the web to the form of the top of the extrusion head have been experimentally confirmed as factors which affect whether the liquid accumulation is maintained or not. Although the factors were regarded as parameters for the application, the conditions which enable the maintaining or keeping of the liquid accumulation could not be clarified. However, the present inventors have confirmed from the results of various experiments that the liquid accumulation is properly maintained or kept at the edge of the back blade if the pressure of the liquid of the accumulation located between the top of the extrusion application head and the web is within a range from 0.2 kg/cm² gauge to 0.8 kg/cm² gauge per 50 cm of width of the applied liquid, even if the other parameters are variously changed. Since the pressure of the liquid of the accumulation cannot be directly measured, it is indirectly measured as follows:

(1) A pressure gauge is installed in a pipe between a liquid feed pump and the extrusion application head. It is preferable to install the pressure gauge immediately upstream to the extrusion application head.

(2) A predetermined quantity of the liquid is supplied to the extrusion application head, the liquid is only poured out of the slit of the head but not applied to the web, and the reading of the pressure gauge is recorded and referred to as $P_1$ in kg/cm².

(3) The same predetermined quantity of the liquid is supplied to the extrusion application head nad applied at a predetermined speed of the web, and the reading of the pressure gauge is recorded and referred to as $P_0$ in kg/cm².

(4) The difference $P_0 - P_1$ between the readings $P_0$ and $P_1$ is considered equal to the pressure P of the liquid of the accumulation.

The present invention is now described in detail with reference to the drawings on the assumption that the pressure P of the liquid of the accumulation is equal to the difference $P_0 - P_1$ between the readings of $P_0$ and $P_1$.

FIG. 1 shows one embodiment of the present invention. Shown in FIG. 1 are a web 1, an extrusion application head, generally 2, comprised of a back blade 3 and a doctor blade 4, and a liquid 5 to be applied. Various forms have been proposed for the top of each of such blades, and other forms can be conceived in the future. About 1 to 10 mm have been proposed for the thickness of such blades. Back blade 3 and doctor blade 4 define a slit 8 through which the liquid to be applied flows out of extruder head 2. A pool of liquid or liquid accumulation 6 forms between moving web 1 and the top of blades 3 and 4.

FIGS. 2, 3, 4 and 5 show typical constructions for the blades of the extruder head, including suitable forms for the edge 7 of back blade 3 which is the defined edge employed in the present invention, and show various states or forms for the liquid accumulation which are kept or maintained in accordance with the present invention as to attain a proper surface quality for the film of the applied liquid. When the liquid accumulation 6 is surely kept by the edge 7 of the back blade as shown in FIGS. 2, 3, 4 and 5, regardless of the form of the whole back blade 3, the proper surface quality is attained.

Figure 2:
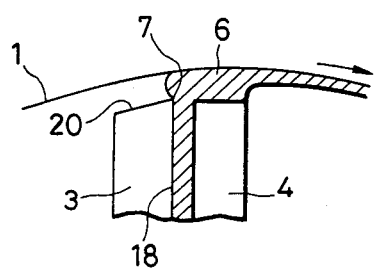
FIGS. 2, 3, 4 and 5 show sectional views of liquid accumulations under proper applying conditions according to the present invention.

In FIG. 2, edge 7 of back blade 3 is defined by the intersection of a first surface 18 which faces front blade 4 and a second surface 20 which is more remote from the front blade then first surface 18. In FIG. 2, edge 7 of back blade 3 is nearest the slit and also is the edge of the back blade which is nearest the moving web.

Figure 3:
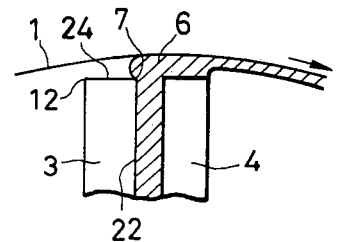

In FIG. 3, edge 7 is defined by a first surface 20 which faces front blade 4 and a second surface 24 which is more remote from the front blade than first surface 22. In FIG. 3, edge 7 is nearest the slit. Back blade 12 also has an edge 12 which is at the same height as edge 7, but edge 12 is not the edge nearest the slit.

Figure 4:
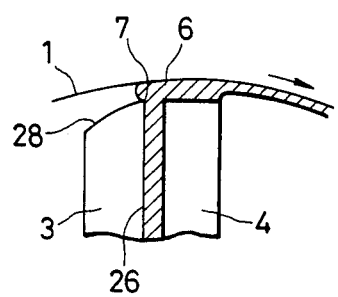

In FIG. 4, edge 7 is defined by a first surface 26 which faces front blade 4 and a second surface 28 which is more remote from the front blade than first surface 26. In FIG. 4, edge 7 of back blade 3 is nearest the slit and also is the edge of the back blade which is nearest moving web 1. In FIGS. 2, 3 and 4, first surfaces 18, 22 and 26, respectively, are the only surfaces of back blade 3 which face front blade 4.

Figure 5:
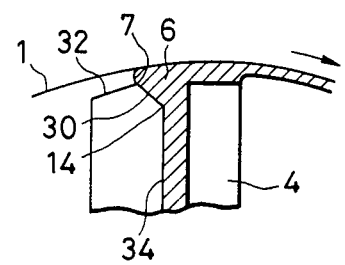

In FIG. 5, edge 7 is defined by a first surface 30 which faces front blade 4 and a second surface 32 which is more remote from the front blade than first surface 30. In FIG. 5, a surface 34 also faces front blade 4, but it is not the highest surface which faces front blade 4, that is, it is not a surface which faces the front blade and which is nearest the web. In FIG. 5, edge 7 of back blade 3 is nearest the web and an edge 14 is the nearest the slit.

When liquid accumulation 6 is not kept or maintained by edge 7 of blade 3, but kept downstream to edge 7 as shown in FIG. 6, that is, is not kept at the highest edge of blade 3, air 9 enters to the whole applied surface of web 1 to make the surface quality of the applied liquid film too low for practical use, as shown by defects 16 in FIG. 7. When liquid accumulation 6 projects beyond the defined edge 7 of the back blade nearest the web as shown in FIG. 8, or beyond the defined edge 7 nearest the slit as shown in FIG. 9, thick streaks 10 as shown in FIG. 10 are made to make the surface quality of the applied liquid film too low for practical use.

It will be understood from the above description that it is necessary to keep the liquid accumulation 6 at the edge 7 of the back blade 3 as shown in FIGS. 2, 3, 4 and 5. For the purpose of the keeping, the pressure of the liquid of the accumulation 6 should be set at 0.2 to 0.8 kg/cm² per 50 cm of the width of the applied liquid.

Examples of the present invention are described in detail below.

EXAMPLE 1

A liquid, which has a composition shown in Table 1 and which is employed to make a magnetic layer, is applied to a web through the use of back blades whose forms are shown at (a), (b) and (c) in FIG. 11. The speed of the application, the thickness of the web, the tension of the web and the width of the application are set at 100 m/min., 15μ, 20 kg per meter of width, and 500 mm, respectively. The applied quantity of the liquid is varied by degrees to compare the surface of applied liquid films with each other. The results of the comparison with regard to the form of the accumulation of the liquid and the pressure of the liquid of the accumulation are shown in Table 2.

Table 1

Composition of magnetic liquid 100 parts of a cobalt-containing magnetic iron oxide ($S_{BET}$: 35 m$^2$/g),
10 parts of nitrocellulose,
8 parts of a polyurethane resin (commercial product "Nipporan 2304" made by Nippon Polyurethane Co., Ltd.),
8 parts of a polyisocyanate,
2 parts of $Cr_2O_3$,
2 parts of carbon black (average grain diameter: 20μ),
1 part of stearic acid,
1 part of a butyl stearate,
300 parts of methyl ethyl ketone.

TABLE 2

| Applied Quantity (cc./m$^2$) | Back Blade (a) State | Back Blade (a) Pressure (kg/cm$^2$) | Back Blade (b) State | Back Blade (b) Pressure (kg/cm$^2$) | Back Blade (c) State | Back Blade (c) Pressure (kg/cm$^2$) |
|---|---|---|---|---|---|---|
| 5 | X | 0.08 | X | 0.13 | X | 0.09 |
| 10 | X | 0.11 | O | 0.17 | X | 0.13 |
| 20 | X | 0.15 | O | 0.28 | O | 0.20 |
| 40 | O | 0.40 | O | 0.55 | O | 0.46 |
| 60 | O | 0.72 | O | 0.82 | O~XX | 0.78 |
| 80 | XX | 1.20 | XX | 1.35 | XX | 1.25 |

State: State of application
Pressure: Pressure of liquid of accumulation
X: A liquid accumulation form shown in FIG. 6 and an applied liquid surface state shown in FIG. 7 are made. The application is not proper.
O: Liquid accumulation forms shown in FIGS. 2, 3, 4 and 5 are made. The applied liquid surface state is good.
XX: Liquid accumulation forms shown in FIGS. 8 and 9 and an applied liquid surface state shown in FIG. 10 are made. The application is not proper.

As understood from Table 2, the range of the quantity of the liquid which can be applied well varies in terms of the form of the application head. This can be attributed to the fact that the size of the liquid accumulation made between the extrusion application head and the web, the pressure of the web on the liquid accumulation and the gap between the head and the web vary. It is understood that as long as the pressure of the liquid of the accumulation is within a range from about 0.2 kg/cm$^2$ to about 0.8 kg/cm$^2$, the liquid accumulation is maintained by the edge of the back blade and the extrusion application head so as to make the quality of the surface of the applied liquid film good.

EXAMPLE 2

A blade shown at (c) in FIG. 11 is used to apply the same liquid as in Example 1. The speed of the application is 200 m/min. The other conditions are the same as in Example 1. The results of the application are shown in Table 3.

TABLE 3

| Applied Quantity (cc./m$^2$) | Application speed: 200 m/min. State | Pressure (kg/cm$^2$) |
|---|---|---|
| 5 | X | 0.15 |
| 10 | X | 0.19 |
| 12 | O | 0.22 |
| 20 | O | 0.42 |
| 30 | O | 0.75 |
| 40 | XX | 1.16 |

State: State of application
Pressure: Pressure of liquid of accumulation
X: A liquid accumulation form shown in FIG. 6 and an applied liquid surface state shown in FIG. 7 are made. The application is not proper.
O: Liquid accumulation forms shown in FIGS. 2, 3, 4 and 5 are made. The applied liquid surface state is good.
XX: Liquid accumulation forms shown in FIGS. 8 and 9 and an applied liquid surface state shown in FIG. 10 are made. The application is not proper.

When the speed of the application is increased, air is more likely to cause problems at the low flow rate of the liquid than in Example 1. In that case, the pressure of the liquid of the accumulation needs to be increased because of the greater likeliness of problems caused by air. However, it is understood from the results that a pressure of about 0.2 kg/cm$^2$ or more is high enough at that time to provide good results.

As long as the applied quantity of the liquid per unit area is constant, the pressure of the liquid of the accumulation increases accordingly as the speed of the application rises. This is because the pressure loss caused by the passing of the liquid along the doctor blade increases. Therefore, the pressure of the liquid accumulation needs to be made higher at the high application speed in the small applied quantity than at the low application speed. As a result, the liquid accumulation greatly extends from the edge of the back blade and goes out upstream with respect to the direction of the movement of the web.

EXAMPLE 3

The thickness of a web is set at 38μ and 75μ. The same liquid as in Example 1 is applied to the web. A back blade whose form is shown at (a) in FIG. 11 is used. The other conditions are the same as in Example 1. The results of the application are shown in Table 4.

TABLE 4

| Applied Quantity (cc./m$^2$) | Web Thickness: 38μ State | Web Thickness: 38μ Pressure (kg/cm$^2$) | Web Thickness: 75μ State | Web Thickness: 75μ Pressure (kg/cm$^2$) |
|---|---|---|---|---|
| 5 | X | 0.09 | X | 0.17 |
| 7 | X | 0.11 | O | 0.20 |
| 10 | X | 0.13 | O | 0.22 |
| 20 | O | 0.20 | O | 0.50 |
| 30 | O | 0.32 | O | 0.69 |
| 40 | O | 0.48 | O | 0.70 |
| 50 | O | 0.70 | XX | 0.95 |
| 60 | XX | 0.94 | — | — |

State: State of application
Pressure: Pressure of liquid of accumulation
X: A liquid accumulation form shown in FIG. 6 and an applied liquid surface state shown in FIG. 7 are made. The application is not proper.
O: Liquid accumulation forms shown in FIGS. 2, 3, 4 and 5 are made. The applied liquid surface state is good.
XX: Liquid accumulation forms shown in FIGS. 8 and 9 and an applied liquid surface state shown in FIG. 10 are made. The application is not proper.

When the thickness of the web is increased, the range of good applicability of the liquid corresponds to a smaller applied quantity than in Example 1. This can be attributed to the fact that when the thickness of the web is increased, the pressure on the liquid of the accumulation is increased and the pressure of the liquid of the accumulation therefore needs to be made higher for the larger thickness of the web as far as the applied quantity of the liquid is constant. However, it is understood again that the liquid accumulation can be maintained or kept well by the edge of the back blade as long as the pressure of the liquid of the accumulation is within a range from about 0.2 kg/cm² to about 0.8 kg/cm².

Examples 1, 2 and 3 as described above show different embodiments of the present invention performed under various conditions. As can be seen from the examples, various parameters affect whether or not the liquid accumulation can be maintained or kept by the edge of the back blade, and various tests were conducted as to the parameters. The results of the tests show the following:

(1) The quality of the surface of the applied film is good, only when the liquid accumulation is maintained or kept by the top of the back blade.
(2) The pressure of the liquid of the accumulation is within the range of from 0.2 kg/cm² to 0.8 kg/cm² per 50 cm of the width of the applied liquid when the liquid accumulation is maintained or kept by the top of the back blade.

As long as the above conditions (1) and (2) are established, the quality of the surface of the applied liquid film is good, regardless of variations in other conditions.

When the extrusion application of a liquid to a web is performed without supporting the web on the reverse side thereof, the accumulation of the liquid to be applied is maintained or kept by the edge of the back blade in accordance with the present invention. For that reason, the liquid can be rapidly and uniformly applied as a thin film to the web without causing a defect such as an application irregularity.

It will be understood that the above description of the present invention is susceptible to various modifications, changes and adaptations, and the same are intended to be comprehended within the meaning and range of equivalents of the appended claims.

What is claimed is:

1. A method of applying a liquid to a moving web while pushing an extrusion application head to said moving web without supporting said moving web on the reverse side thereof, the extrusion head having a back blade and a front blade which define a slit through which the liquid leaves the head, and wherein a liquid accumulation forms in a narrow gap between the web and extrusion application head, comprising: applying the liquid to the web while the accumulation of said liquid to be applied to said moving web is maintained by (a) the moving web and (b) an edge of the back blade of the extrusion application head, the edge being defined by the intersection of (1) a first surface of the back blade which faces the front blade and which is nearest the web, and (2) a second surface of the back blade which is more remote from the front blade than the first surface and, wherein the pressure of the liquid of the accumulation located between the web and the outlet portion of the slit of the extrusion application head is set within a range from 0.2 kg/cm² guage to 0.8 kg/cm² guage per 50 cm of width of applied liquid.

2. The method according to claim 2, wherein the liquid accumulation prevents contact between the back blade and web.

* * * * *